Figure 1:
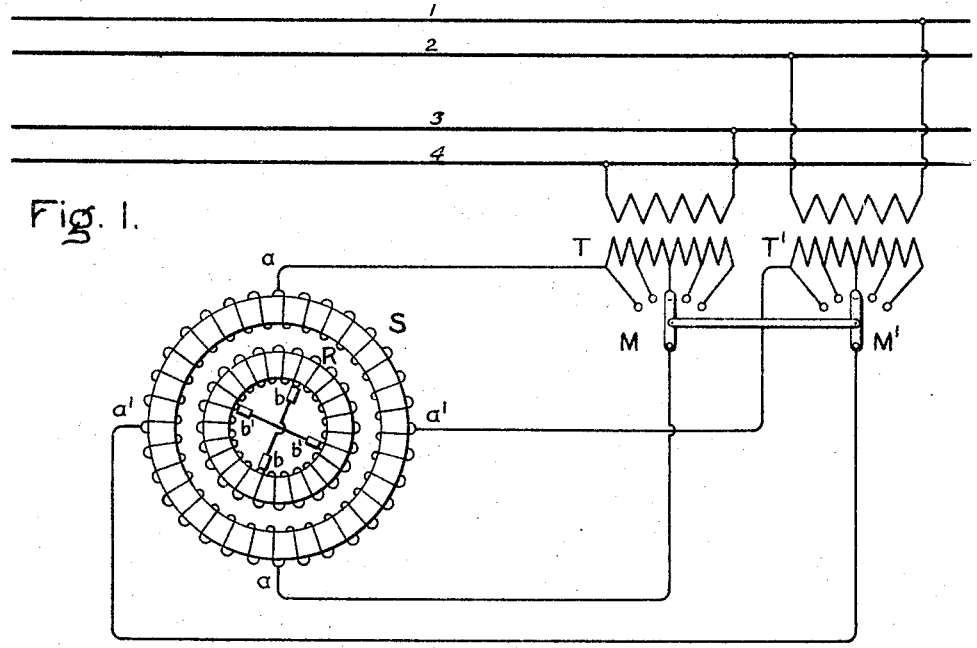

No. 772,950. PATENTED OCT. 25, 1904.
M. MILCH.
ALTERNATING CURRENT MOTOR.
APPLICATION FILED FEB. 10, 1904.
NO MODEL.

Witnesses:

Inventor,
Maurice Milch.
by
Att'y.

No. 772,950.   Patented October 25, 1904.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

SPECIFICATION forming part of Letters Patent No. 772,950, dated October 25, 1904.

Application filed February 10, 1904. Serial No. 192,923. (No model.)

*To all whom it may concern:*

Be it known that I, MAURICE MILCH, a subject of the King of Austria-Hungary, residing at Schenectady, in the county of Schenectady and State of New York, have invented certain new and useful Improvements in Alternating-Current Motors, of which the following is a specification.

My invention relates to polyphase alternating-current motors; and its object is to provide a novel motor of the polyphase type that may be controlled over wide ranges of speed with high efficiency and torque over the entire range.

Polyphase induction-motors as ordinarily constructed, while possessing good efficiency near synchronism, have the disadvantage that the speed cannot be controlled over any considerable range without loss in respect to efficiency or torque. When the speed of such motors is controlled by the insertion of resistance in the primary or secondary circuit, power is wasted in the resistances and the efficiency of the motor decreased. If it is attempted to control the motor by varying the impressed voltage, the torque of the motor is sacrificed. Consequently neither of the above methods furnishes a suitable means of control for ordinary polyphase induction-motors.

In my application for United States Letters Patent, Serial No. 176,607, filed October 12, 1903, I have described a single-phase motor which may be termed a "repulsion induction-motor" and which admits of efficient control by varying the impressed voltage. This motor consists of a repulsion-motor having, in addition to the usual set of brushes, a second set short-circuited either directly or through a constant or variable source of voltage. Such a motor, as explained in the above-mentioned application, combines the characteristics of the repulsion and induction motors, and since the torque per kilovolt-ampere remains nearly constant for different values of impressed voltage it admits of efficient voltage control. I take advantage of this fact in the arrangement of a polyphase motor by providing the secondary member with a commutator and brushes and disposing the brushes so as to close the circuit of the secondary member on lines making an angle with the lines of magnetization produced by the several phases of the primary member. I cause each phase of the motor to act as a repulsion induction-motor, and by disposing the brushes so that the torque due to the repulsion-induction effect is in the same direction as the torque due to the rotating field I thereby combine the characteristics of the repulsion induction-motor and the polyphase induction-motor. By this means a higher torque is obtained than in either the polyphase induction-motor or the single-phase repulsion-motor. The motor may be controlled by varying the voltage impressed upon the primary member, the repulsion-induction-motor effect predominating at the start when the impressed voltage is low, the induction-motor effect predominating at speeds near synchronism when the maximum voltage is impressed upon the primary member, and both characteristics being combined throughout the entire range of operation.

My invention will best be understood by reference to the accompanying drawings, in which—

Figure 2:
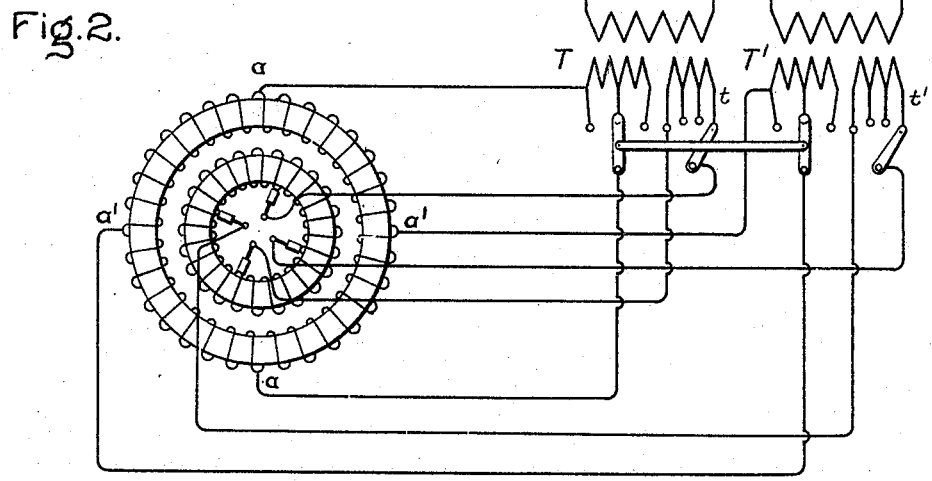

Figure 1 shows diagrammatically a motor arranged in accordance with my invention, and Fig. 2 shows a modification of the same.

In Fig. 1, S represents the stator or primary member of the motor, which for the sake of simplicity is shown as a Gramme ring. It will be understood, however, that any well-known form of winding may be used for either member of the motor. The stator-winding is shown as a two-phase winding. The two phases are shown connected, respectively, to the secondaries of the transformers T and T' through the switch members M and M', by means of which the voltages impressed upon the stator-winding may be varied. The switches M and M' are shown mechanically connected in order that the voltage impressed upon the two phases may be varied simultaneously. R represents the rotor of the motor, which is shown short-circuited on two lines by the brushes $b\,b$ and $b'\,b'$. The brushes $b\,b$ are disposed on a line at an angle to the line of magnetization $a\,a$, produced by the phase of the stator connected to transformer T, this being exactly like the arrangement in the single-phase repulsion-motor. Brushes $b'\,b'$ are similarly disposed with reference to the line of magnetization $a'\,a'$ of the other phase. Thus each phase acts as a repulsion induction-motor, and at starting when the voltage impressed upon the stator is of a low value and the rotating field is consequently weak the characteristics of the motor are essentially those of a repulsion induction-motor and the motor possesses the high starting torque per kilovolt-ampere that is shown by the repulsion induction-motor. As the motor speeds up and the switch members M M' are shifted to increase the voltage impressed upon the stator-winding the revolving field increases in strength and the polyphase-induction-motor action assumes greater prominence until at the speed near synchronism the motor possesses the essential characteristics of an ordinary polyphase induction-motor. At all times, however, the repulsion-induction-motor effect is combined with the induction-motor effect, provided the brushes are displaced in such a way that the corresponding torque is in the direction of rotation of the revolving field and the torque of the motor throughout its range is greater than that of either a simple induction or simple repulsion motor. Should the brushes be displaced in the opposite direction to that above mentioned, the torque due to the repulsion-motor effect would be in the opposite direction to that due to the rotary field effect. As has already been stated, at starting when the impressed voltage is low the repulsion-induction-motor effect predominates. Consequently with this arrangement the motor would start up in a direction opposite to the rotating field. Then as the impressed voltage is increased and the rotating field gains in strength the motor would stop and start up in the opposite direction. Consequently the brushes should always be properly disposed with relation to the lines of magnetization of the several phases of the primary member, so that the repulsion-induction-motor torque may be in the same direction as the induction-motor torque.

My invention is not limited to the specific form of motor shown in Fig. 1, but is applicable to many different arrangements. The brushes of each set need not be directly short-circuited, but may have their circuit closed through an impedance or other suitable regulating device, if desired. In Fig. 2 I have shown the circuit of the rotor-brushes closed through sources of variable voltage $t\,t'$ for compensating for the magnetizing-current or for the purpose of further voltage control. Many other means of control may be used in combination with my invention, if desired.

Although I have shown my invention as applied to a two-phase bipolar motor, it will be understood that it is not limited to this particular form, but that it is applicable to motors having any number of phases and any number of poles, and so far as mechanical construction is concerned it will be understood that my motor will be of the same general design as the ordinary polyphase induction-motor with slotted primary and secondary members, only the winding on the secondary member instead of being directly short-circuited will have its circuit closed through a commutator and brushes bearing thereon. Accordingly I do not desire to limit myself to the particular construction and arrangement of parts here shown, since changes which do not depart from the spirit of my invention and which are within the scope of the appended claims will be obvious to those skilled in the art.

What I claim as new, and desire to secure by Letters Patent of the United States, is—

1. In an alternating-current motor, a polyphase winding on one member, and a winding on the other member connected in closed circuits on lines displaced from the lines of magnetization of the several phases of the first member.

2. In an alternating-current motor, a polyphase winding on one member, and a winding on the other member connected in closed circuits on lines displaced from the lines of magnetization of the several phases of the first member to produce a repulsive torque in the direction of rotation of the field produced by said phases.

3. In an alternating-current motor, a polyphase primary member, a rotatable secondary member provided with a commutator, and short-circuiting brushes bearing on said commutator and displaced from the lines of magnetization of the several phases of the primary member.

4. In an alternating-current motor, a polyphase primary member, a rotatable secondary member provided with a commutator, a plurality of sets of brushes bearing on said commutator and corresponding in number to the phases of the primary member, said sets of brushes being displaced from the lines of magnetization of the several phases of the primary member to produce a repulsive torque in the direction of rotation of the field produced by said phases, and electrical conductors connecting the brushes of each set.

5. In an alternating-current motor, a polyphase primary winding on one member, a secondary winding on the other member, and means for connecting said secondary member in closed circuits to produce with the several phases of the primary member a repulsive torque in the same direction as the torque due to the rotating field in the primary member.

6. In an alternating-current motor, a polyphase primary member, and a rotatable secondary member provided with a commutator and short-circuiting brushes, said brushes being so disposed that each phase of the primary member acts with the secondary member to produce a repulsive torque in the same direction as the torque due to the rotating field in the primary member.

7. In an alternating-current motor, a polyphase primary winding on one member, a secondary winding on the other member, means for connecting said secondary member in closed circuits to produce with the several phases of the primary member a repulsive torque in the same direction as the torque due to the rotating field in the primary member, and means for impressing variable polyphase voltages on the primary member.

8. In an alternating-current motor, a polyphase winding on one member, and a winding on the other member connected in closed circuits on lines displaced from the lines of magnetization of the several phases of the first member to produce a repulsive torque in the direction of rotation of the field produced by said phases, and means for impressing variable polyphase voltages on the winding of the first member.

In witness whereof I have hereunto set my hand this 8th day of February, 1904.

MAURICE MILCH.

Witnesses:
BENJAMIN B. HULL,
HELEN ORFORD.